(12) United States Patent
Kampmann (10) Patent No.: US 9,112,959 B2
(45) Date of Patent: Aug. 18, 2015

(54) SYSTEM AND METHOD FOR MEDIA GATEWAY NEGOTIATION

(75) Inventor: Dirk Kampmann, Vaals (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1862 days.

(21) Appl. No.: 12/206,218

(22) Filed: Sep. 8, 2008

(65) Prior Publication Data

US 2010/0061363 A1 Mar. 11, 2010

(51) Int. Cl.
*H04L 12/28* (2006.01)
*H04M 7/12* (2006.01)

(52) U.S. Cl.
CPC ................................. *H04M 7/127* (2013.01)

(58) Field of Classification Search
None
See application file for complete search history.

(56) References Cited

U.S. PATENT DOCUMENTS

| | | | |
|---|---|---|---|
| 6,671,367 B1 | 12/2003 | Graf et al. | |
| 7,212,622 B2 | 5/2007 | Delaney et al. | |
| 7,564,835 B1 * | 7/2009 | Grabelsky et al. | 370/352 |
| 8,005,090 B2 * | 8/2011 | Nakamichi et al. | 370/395.21 |
| 2004/0165537 A1 * | 8/2004 | Lee et al. | 370/252 |
| 2007/0053343 A1 * | 3/2007 | Suotula et al. | 370/352 |
| 2008/0049643 A1 * | 2/2008 | Arcese et al. | 370/254 |

* cited by examiner

*Primary Examiner* — Gregory Sefcheck
*Assistant Examiner* — Daniel Mitchell (57) ABSTRACT

A system and method of negotiating Media Gateways (MGs) between a plurality of call control nodes (CCNs). The system includes a first CCN which builds an original list of identifiers associated with at least one MG capable of being used in a call by the first CCN. The system also includes a second CCN for receiving the original list of identifiers from the first CCN. The second CCN removes from the original list any identifiers associated with any MG in the original list of identifiers which is not capable of being used in the call by the second CCN. The second CCN then forms a modified list of identifiers associated with at least one MG capable of being used in a call by the first CCN and the second CCN. The second CCN also selects a specified MG from the modified list and sends a first backward message from the second CCN to the first CCN identifying the specified MG. The first CCN may then validate that the specified MG is on the original list of identifiers and selects the specified MG for the call.

29 Claims, 5 Drawing Sheets

SYSTEM AND METHOD FOR MEDIA GATEWAY NEGOTIATION

BACKGROUND

The present invention relates to communications networks. More particularly, and not by way of limitation, the present invention is directed to a system and method for media gateway negotiation in a telecommunications network.

A layered network architecture is commonly used in telecommunication networks. At call setup, a Call Control Node (CCN) acts as a Media Gateway Controller (MGC). The CCN, such as a Mobile service Switching Center (MSC), Gateway MSC (GMSC), a Transit Switching Center (TSC) or a Media Gateway Control Function (MGCF), selects a Media Gateway (MG) to switch the user plane and to provide in-band equipment if necessary.

In many call cases, multiple CCNs are involved in call setup. Call setup information is signaled between CCNs using call control protocols, such as Integrated Services Digital Network User Part (ISUP), Bearer Independent Call Control (BICC) or Session Initiated Protocol (SIP). When a CCN selects a MG, call control protocols may provide a capability to send the identifier of the selected MG to the succeeding CCN. The succeeding CCN has the choice to select the same MG for user plane switching. In many cases selecting the same MG in subsequent CCN's allows better resource utilization in the nodes and in the network.

Figure 1:
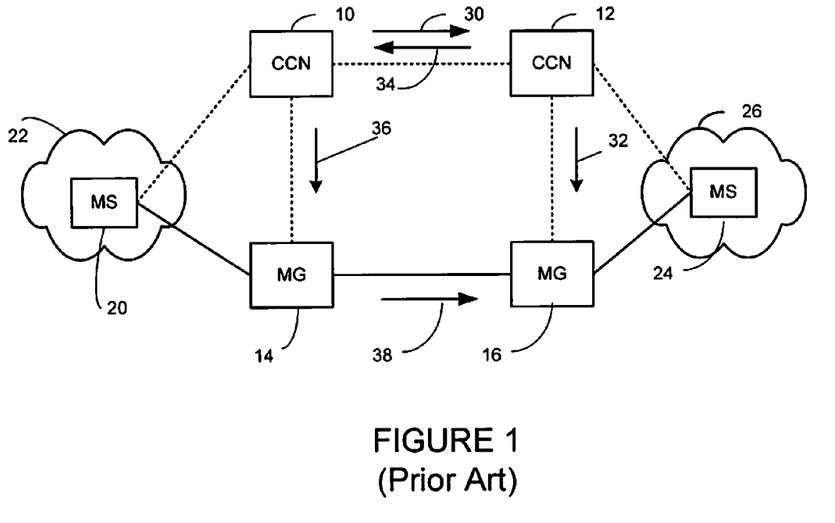
FIG. 1 (Prior Art) is a simplified block diagram of forward bearer setup utilizing BICC for call control protocol.

One typical call setup scenario for telephone calls (mobile or fixed), utilizes a procedure of forward bearer setup. In this scenario, the bearer is established from the calling side towards the called side. FIG. 1 is a simplified block diagram of forward bearer setup utilizing the BICC call control protocol. A preceding CCN 10 and a succeeding CCN 12 each controls a MG (MG 14 and MG 16 respectively) for user plane switching. In order to achieve forward bearer setup, the succeeding CCN 12 selects a MG first and sends a MG identifier and bearer address information backwards to the preceding CCN 10. The preceding CCN 10 then selects the MG and initiates bearer setup procedure. A mobile station (MS) 20 may operate in, for example, a GSM/EDGE Radio Access Network (GERAN) 22. The CCN 10 communicates with the mobile station 20. An MS 24 operates in a GERAN 26 and communicates with the CCN 12. The CCN 10, CCN 12, MS 20, and MS 24 communicate on a signaling plane. The MS 20, MS 24, MG 14, and MS 16 communicate on a user plane.

An Initial Address Message (IAM) message is sent in 30 from CCN 10 to CCN 12 providing call setup information. Next, in 32, the CCN 12 selects the MG 16 and seizes MG resources for the connection end point. An identifier for MG 16 is sent back from CCN 12 to CCN 10 at 34 (e.g., APM (Bearer Control Unit Identifier (BCU-ID)). At 36, the CCN 10 then selects a MG and seizes MG resources for the connection end point. Triggered from CCN 10, MG 14 starts bearer establishment procedures at 38. When Internet Protocol (IP) is used as the user plane transport protocol and BICC is used as the call control protocol, then bearer setup messages are tunneled (not shown) via call control nodes, CCN 10 and CCN 12.

In practice, oftentimes the succeeding node CCN 12 can select from a set of MGs without knowing which MGs can be selected in the preceding node CCN 10. Consequently, there is no guarantee that the MG selected in CCN 12 can also be selected in CCN 10. If CCN 10 and CCN 12 do not select a common MG, longer user plane routes may result.

Figure 2:
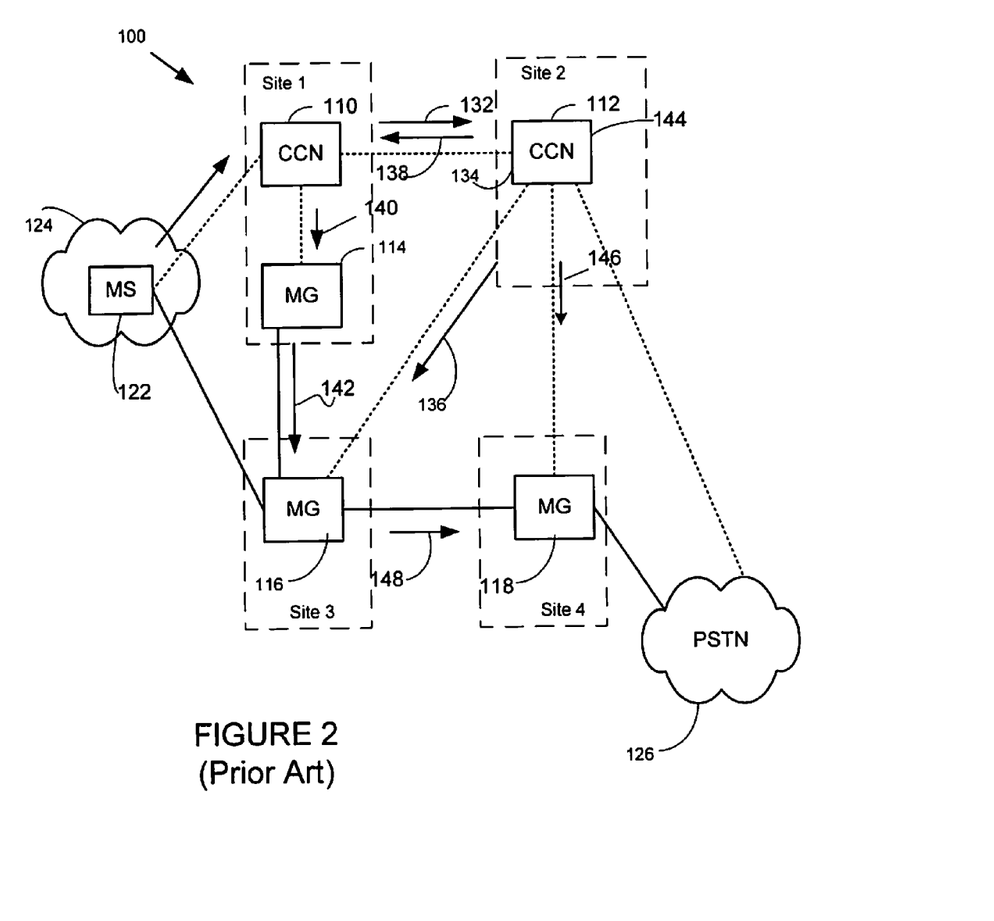
FIG. 2 (Prior Art) is a simplified block diagram of an exemplary existing forward bearer setup utilizing three sites.

FIG. 2 is a simplified block diagram of an exemplary existing forward bearer setup utilizing three sites. A network 100 includes a preceding CCN 110 and a succeeding CCN 112. The network includes a MG 114, MG 116, and MG 118. The network includes a MS 122 in a GERAN 124. In addition, FIG. 2 illustrates a Public Switched Telephone Network (PSTN) 126. The CCN 110 and MG 114 are located in site 1. The CCN 12 is located in site 2. The MG 116 is located in site 3 and the MG 118 is located in site 4. The MS 122 and CCN 110, CCN 110 and CCN 112, CCN 110 AND MG 114, CCN 112 and MG 116, CCN 112 and MG 118, and CCN 112 and the PSTN 126 communicate on a signaling plane. The MS 122 communicates with the MG 114, the MG 116 and MG 118, the MG 118 and the PSTN 126, and the MG 114 and the MG 116 communicate on a user plane.

In this example, it is assumed that the CCN 112 has to play an announcement, for example due to Intelligent network (IN) interworking, before the call can be routed to the destination network (e.g., PSTN 126). At the end of the call setup, the MGs on three sides are involved in the call. In 130, a set message is sent from the MS 122 to the CCN 110. Next, in 132, the CCN 110 sends a BICC IAM message to the CCN 112. In 134, the CCN 112 determines that an announcement must be played (e.g., due to IN interworking). Next, in 136, the CCN 112 selects a MG to establish the bearer (user plane) and to play an announcement. As illustrated, CCN 112 selects the MG 116. In 138, the CCN 112 sends an identifier of the MG 116 backwards to the CCN 110. In this example, it is assumed that the CCN 110 is unable to select MG 116. Therefore, in 140, the CCN 110 selects another MG, in this case, MG 114. In 142, a bearer is established between the MG 114 and the MG 116 and CCN 110 establishes as well the connection between MS 122 and MG 114 (not shown). In 144, the CCN 112 continues call setup after the announcement is played. The CCN 112 identifies the call to be routed to the PSTN. Next, in 146, the CCN 112 selects a MG that can connect the user plane to the PSTN, in this case, the MG 118. Another bearer is then established between MG 116 and MG 118 at 148 and between MG 118 and PSTN 126.

Existing forward bearer setups suffer from the disadvantage of oftentimes utilizing unnecessarily long user plane routes. In addition, extra network resources are utilized for the bearer setup. It would be advantageous to have a bearer setup which conserves network resources while providing a forward bearer setup.

SUMMARY

The present invention provides a methodology to negotiate MGs between call control nodes that can be used in a call. This negotiation method provides the opportunity for subsequent call control nodes to agree on a common MG. Such a selection improves the usage of resources in the network.

The present invention provides a system and method for negotiating Media Gateways (MGs) between a plurality of call control nodes (CCNs). Thus, in one aspect, the present invention is directed to a system identifier which includes a first CCN which builds an original list of identifiers associated with at least one MG capable of being used in a call by the first CCN. The system also includes a second CCN for receiving the original list of identifiers from the first CCN. The second CCN removes from the original list any identifiers associated with any MG in the original list of identifiers which is not capable of being used in the call by the second CCN. The second CCN then forms a final list of identifiers associated with at least one MG capable of being used in a call by the first CCN and the second CCN. The second CCN then selects a specified MG from the modified list and sends a first backward message from the second CCN to the first CCN identifying the specified MG. The first CCN may validate that the specified MG is on the original list of identifiers and if this is the case selects the specified MG for the call.

In another aspect, the present invention is directed to a method of negotiating MGs between a plurality of CCNs. A first CCN builds an original list of identifiers associated with at least one MG capable of being used in a call by the first CCN. Next, the original list of identifiers is sent to a second CCN. The second CCN removes from the original list any identifiers associated with any MG in the original list of identifiers which is not capable of being used in the call by the second CCN. The second CCN then forms a modified list of identifiers associated with at least one MG capable of being used in a call by the first CCN and the second CCN. The modified list of identifiers is then sent to a third CCN. The third CCN removes any identifiers associated with any MG in the modified list of identifiers which is not capable of being used in the call by the third CCN. The third CCN then forms a final list of identifiers associated with at least one MG capable of being used in a call by the first CCN, the second CCN, and the third CCN. The third CCN then selects a specified MG from the final list of identifiers. The third CCN sends a first backward message to the second CCN identifying the specified MG. In addition, a second backward message is sent from the second CCN to the first CCN identifying the specified MG.

In still another aspect, the present invention is a control node for negotiating MGs. The node receives a first list of identifiers associated with at least one MG capable of being used in a call by a second node. The control node removes from the first list any identifiers associated with any MG in the first list of identifiers which is not capable of being used in the call by the control node. In addition, the control node forms a second list of identifiers associated with at least one MG capable of being used in a call by the control node and the second node. The control node may also select a specified MG from the second list and send a first backward message from the control node to the second node identifying the specified MG.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 3:
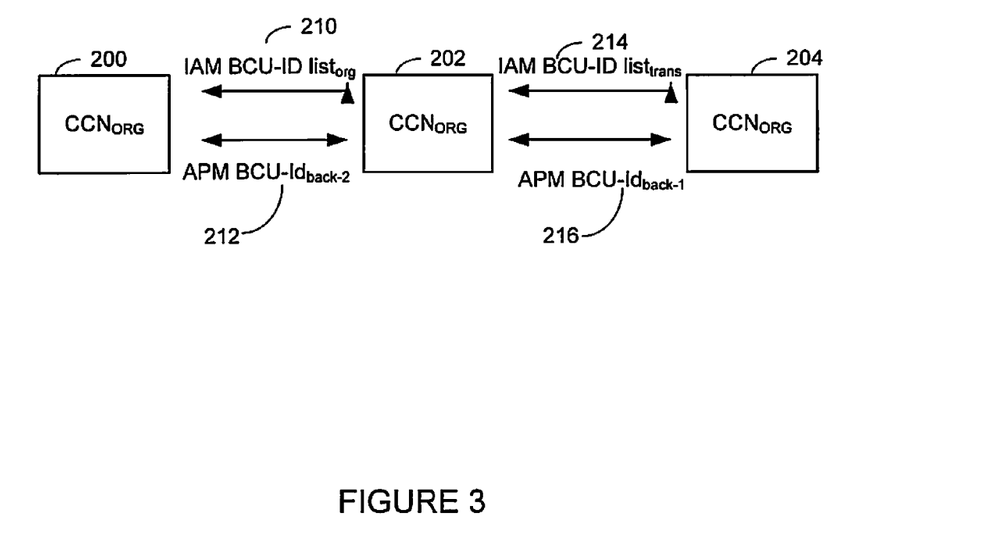
FIG. 3 illustrates a simplified block diagram of a plurality of CCNs utilizing a MG node negotiation according to the teachings of the present invention.

FIG. 3 illustrates a simplified block diagram of a plurality of CCNs utilizing a MG node negotiation according to the teachings of the present invention. The present invention includes an originating CCN 200 ($CCN_{org}$), a transfer CCN 202 ($CCN_{trans}$), and a terminating CCN 204 ($CCN_{term}$). CCN 200 builds a list of MG identifiers (BCU-ID $list_{org}$) that can be used to establish the call. This list is added to the call setup message, which is sent (e.g., as an IAM) to the next CCN (i.e., CCN 202) at 210, which may forward the message to another CCN in this example to CCN 204. When the CCN 200 receives a backward message (e.g., an Application Transport Mechanism (APM)) at 212, if the message includes a MG node identifier (BCU-ID$_{back-2}$), the CCN 200 validates that the identifier is specified in the original list (BCU-ID $list_{org}$). If the received identifier is specified in the original list, then the CCN selects the MG for call establishment. Otherwise, the CCN selects any MG from the original list BCU-ID $list_{org}$ for call establishment. If the message does not include a MG node identifier, the CCN 200 then selects for call establishment any MG node from the original list BCU-ID $list_{org}$. For example, if BICC is used as the call control protocol, the BCU-ID $list_{org}$ is then added to the IAM message. The received identifier BCU-ID$_{back}$ is received in an APM message.

A CMN (call mediation node, not shown) may be involved in passing the messages between call control nodes. The CMN does not control MGs and preferably, transparently transfers the list of MG node identifiers between the controlling nodes.

CCN 202 transfers the call setup message, but has to select a MG node for the call ($CCN_{trans}$). Additionally, the CCN 202 performs several steps. CCN 202 receives the call setup message (e.g., IAM in BICC) at 210. If this message includes a list of MG node identifiers (BCU-ID$_{org}$), then the CCN 202 performs the following steps: CCN 202 removes any unknown BCU-ID from the list and CCN 202 also removes any BCU-ID from the list that is associated with a MG that cannot be used for the call. CCN 202 then processes the remaining list, BCU-ID $list_{trans}$ as follows: if there is at least one element left in the list, CCN 202 forwards the list (BCU-ID $list_{trans}$) in the call setup message sent to the succeeding node at 214; if the list is empty, the CCN 202 starts a MG negotiation towards the succeeding node. CCN 202 builds and sends a BCU-ID list as described for the CCN 200. If the received call setup message does not include a list of MG identifiers (BCU-ID$_{org}$), then CCN 202 starts a MG negotiation as described above for CCN 200. In all cases described the negotiation is started before CCN 202 sends the list of MG identifiers to the succeeding node at 214.

When CCN 202 receives a backward message at 216, if the message includes a MG node identifier (BCU-ID$_{back-1}$), CCN 202 validates if the identifier is specified in the previously forwarded list (BCU-ID $list_{trans}$). If the received identifier is specified in the forwarded list BCU-ID $list_{trans}$, then CCN 202 selects the MG node for call establishment. Otherwise, CCN 202 selects for call establishment any MG that is listed in the previously sent list, BCU-ID $list_{trans}$. If the backward message does not include a MG node identifier, then the CCN 202 selects for call establishment any MG that is listed in the previously sent list BCU-ID $list_{trans}$. The BCU-ID of the selected MG is then passed in a backward direction (BCU-ID$_{back-2}$) as defined in current standards.

CCN 204 terminates MG negotiation and performs the following steps: CCN 204 receives a call setup message (e.g. IAM in BICC) at 214; if this message includes a list of MG node identifiers, then CCN 204 removes any unknown BCU-ID from the list and any BCU-ID from the list that is associated with a MG node that cannot be used for the call. CCN 204 then processes the remaining list BCU-ID $list_{trans}$ as follows:

If there is at least one element left in the list, then CCN 204 selects one of the MGs and uses the associated MG to establish the user plane; if the list is empty, then CCN 204 selects any MG that is applicable for the call. CCN 204 then sends backward the BCU-ID of the selected MG node (BCU-ID$_{back-1}$) as defined in current standards. However, if the received call setup message does not include a list of MG identifiers, then the CCN 204 selects any MG that is applicable for the call.

Instead of just sending a list of BCU-IDs, it is possible to send, as well an identifier associated with the list of BCU-IDs. In one embodiment of the present invention for MG node negotiation in BICC, if BICC is used as the call control protocol, then BCU-ID$_{MGG}$ is defined with the same data format as the BCU-ID is defined for the BICC protocol (i.e., 5 octets). This value can be passed over the standard BICC message without any modification. Any node that does not know the value has to ignore this parameter (BICC standard). In nodes that support the usage of BCU-ID$_{MGG}$, the value is treated as an identifier for a set of MG nodes and MG node negotiation is performed.

The present invention provides a procedure to negotiate MG nodes between call control nodes that can be used in a call. This negotiation procedure provides the opportunity for subsequent call control nodes to agree on a common MG. Such a selection improves the usage of resources in the network. The call control node that sends a call setup message (e.g. AM in BICC) in a forward direction adds to the message a list of MGs which are eligible for the call. Any subsequent CCN removes those MG nodes from that list which the subsequent CCN does not know or cannot select for the call. A CCN that has to establish the user plane, for example an announcement has to be played, selects a MG from the negotiated list of MGs. The identifier of the selected MG node is sent in a backward direction, giving the preceding node the opportunity to select the same MG node.

Instead of sending a list of MG node identifiers, in another embodiment of the present invention, an identifier for the group of MGs may be sent. In case an intermediate node wants to remove a BCU-ID from this list, it has to select a new identifier representing this modified list of BCU-IDs. This embodiment of the present invention is applicable in case a MG is selected on a succeeding node first, for example in BICC using forward bearer setup procedure.

Figure 4A:
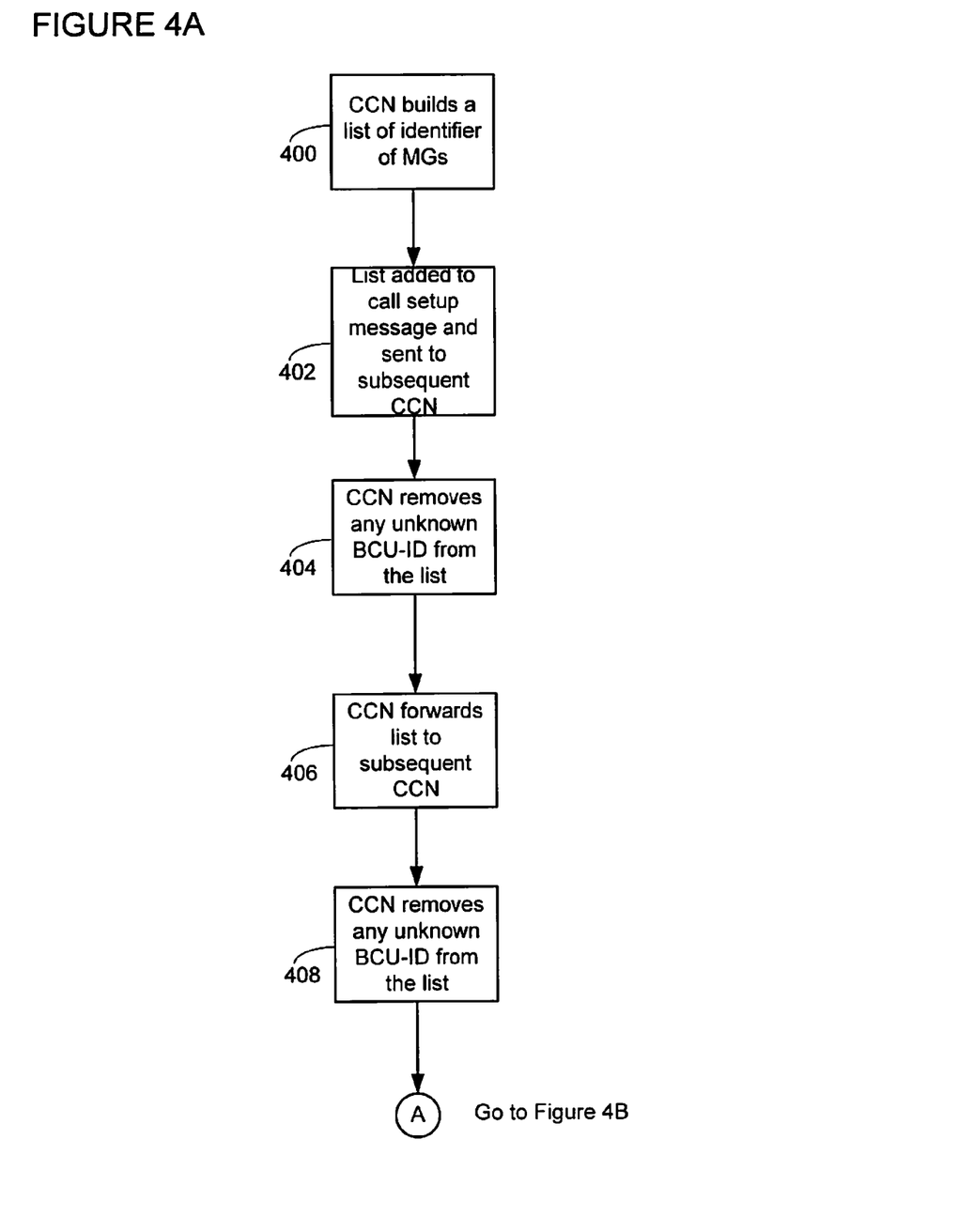
FIGS. 4A and 4B are flowcharts illustrating the steps of MG node negotiation according to the teachings of the present invention.
Figure 4B:
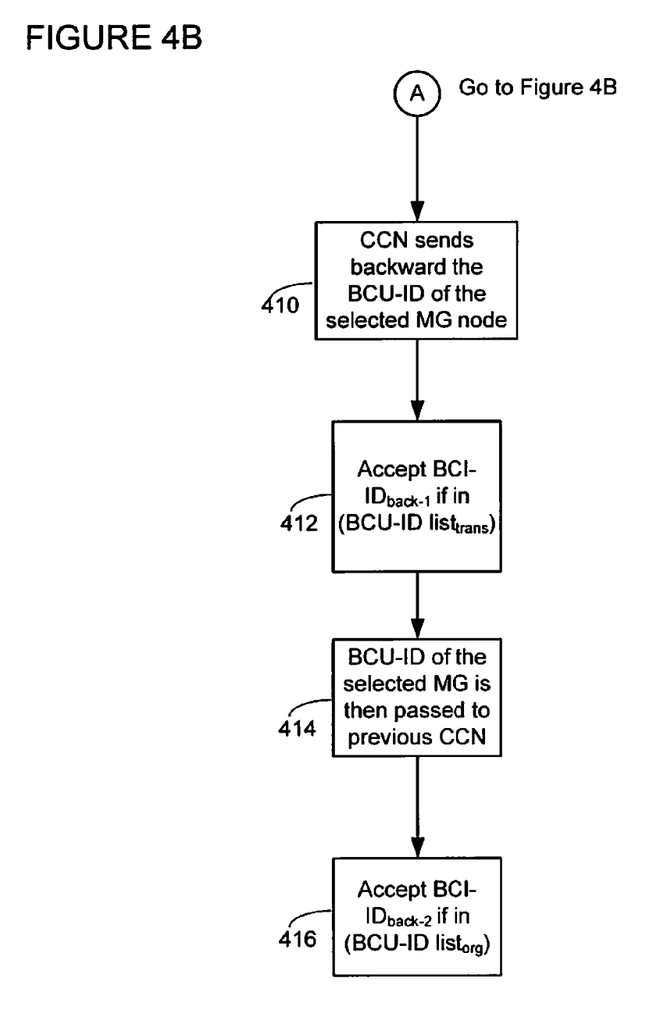

FIGS. 4A and 4B are flowcharts illustrating the steps of MG node negotiation according to the teachings of the present invention. With reference to FIGS. 3 and 4, the method will now be explained. First, in step 400, CCN 200 (1) builds a list of identifiers of MGs (BCU-ID list$_{org}$) that can be used to establish the call. Next, in step 402, this list is added to the call setup message, which is sent to CCN 202 (2) (see 210). In step 404, CCN 202 (2) removes any unknown BCU-ID from the list. In addition, CCN 202 (2) also removes any BCU-ID that cannot be used for the call. Next, in step 406, if there is at least one element left in the list, CCN 202 (2) forwards the list (BCU-ID list$_{trans}$) in the call setup message to succeeding CCN 204 (3) (see 214 in FIG. 3).

In step 408, CCN 204 (3) removes from the list any unknown BCU-ID or any BCU-ID that cannot be used for the call. CCN 204 (3) then sends backward the BCU-ID of the selected MG node (BCU-ID$_{back-1}$) to CCN 202 (2) in step 410 (see 216 in FIG. 3). Next, in step 412, CCN 202 (2) validates if the identifier is specified in the previously forwarded list (BCU-ID list$_{trans}$). If the received identifier is specified in the forwarded list BCU-ID list$_{trans}$, then the CCN selects the associated MG for call establishment. Next, in step 414, the BCU-ID of the selected MG is then passed in backward direction (BCU-ID$_{back-2}$) to CCN 200 (1) (see 212 in FIG. 3). In step 416, CCN 200 validates if the identifier in the backward message is specified in the original list (BCU-ID list$_{org}$). If the received identifier is specified in the original list, then CCN 200 (1) selects this MG for call establishment. Otherwise, CCN 200 (1) selects any MG from the original list BCU-ID list$_{org}$ call establishment.

The present invention provides a system and methodology to negotiate a common MG between CCNs including in systems for call cases where forward bearer setup is applied. By selecting common MGs, resource utilization is improved within the network. The present invention may also be applied for the standard BICC protocol without impacting current BICC standards. Although three CCNs are illustrated, it should be understood that the present invention may be incorporated in any system have two or more CCNs.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed:

1. A method of negotiating Media Gateways (MGs) between a plurality of call control nodes (CCNs), the method comprising the steps of:
    a first CCN building an MG identifier list, each identifier in the MG identifier list being a Bearer Control Unit Identifier (BCU-ID) having at least one MG capable of being used in a call by the first CCN;
    sending the MG identifier list to a second CCN;
    the second CCN removing any identifiers, from the MG identifier list, associated with any MG which cannot be used in the call by the second CCN, thereby forming a modified MG identifier list associated with at least one MG capable of being used in a call by the first CCN and the second CCN;
    sending the modified MG identifier list to a third CCN;
    the third CCN removing, from the modified MG identifier list, any identifiers associated with any MG that is not capable of being used in the call by the third CCN, thereby forming a final MG identifier list associated with at least one MG capable of being used in a call by the first CCN, the second CCN, and the third CCN;
    the third CCN selecting a specified MG from the final MG identifier list for establishing a user plane;
    sending a first backward message from the third CCN to the second CCN identifying the specified MG; and
    sending a second backward message from the second CCN to the first CCN identifying the specified MG.

2. The method of claim 1 further comprising, after sending the first backward message, from the third CCN to the second CCN identifying the specified MG, the steps of:
    determining if the specified MG is on the modified MG identifier list; and
    if the specified MG is not on the modified MG identifier list, selecting any MG controlled from the second CCN and applicable for the call.

3. The method of claim 1 further comprising, after sending the second backward message from the second CCN to the first CCN, the steps of:
    determining if the specified MG is on the MG identifier list; and
    if the specified MG is not on the MG identifier list, selecting any MG that is controlled from the first CCN and applicable for the call.

4. The method of claim 1 wherein the step of sending the modified MG identifier list from the second CCN to the third CCN includes sending the modified MG identifier list in an Initial Address Message (IAM).

5. The method of claim 1 wherein the step of sending the MG identifier list to the second CCN includes sending the MG identifier list in a call setup message.

6. The method of claim 1 wherein the step of sending the first backward message from the third CCN to the second CCN includes sending the first backward message as an Application Transport Mechanism (APM).

7. The method of claim 1 further comprising the step of, if the second CCN does not control a MG, passing the modified MG identifier list to the third CCN.

8. The method of claim 1 wherein the first CCN, the second CCN and the third CCN utilize a call control protocol for sending messages.

9. The method of claim 8 wherein the call control protocol is one of a Bearer Independent Call Control (BICC) and Session Initiated Protocol (SIP).

10. The method of claim 1, further comprising a Media Gateway Group (MGG) identifier representing a group of BCU-IDs and when an intermediate node removes a BCU-ID, a new MGG identifier is associated with a modified list of BCU-IDs.

11. The method of claim 1 wherein the method is performed utilizing forward bearer set-up.

12. A system for negotiating Media Gateways (MGs) between a plurality of call control nodes (CCNs), the system comprising:
a first CCN having a processor and associated persistent memory, the associated persistent memory having stored instructions for causing the processor to assemble a first MG identifier list having at least one MG capable of being used in a call by the first CCN and means for sending the first MG identifier list to:
a second CCN, having a second processor and associated persistent memory, the associated persistent memory having stored instructions for causing the second processor to remove any identifiers, from the first MG identifier list, associated with any MG in the first MG identifier list that is not capable of being used in the call by the second CCN, thereby forming a modified MG identifier list associated with at least one MG capable of being used in a call by the first CCN and the second CCN,
the second CCN,
using a specified MG, for establishing a user plane, from the modified MG identifier list, and
sending a first backward message from the second CCN to the first CCN identifying the specified MG.

13. The system according to claim 12 further comprising:
a third CCN having a third processor and associated persistent memory, the associated persistent memory having stored instructions to cause the third processor to receive the modified MG identifier list from the second CCN and for removing from the modified MG identifier list identifiers associated with any MG in the modified MG identifier list that is not capable of being used in the call by the third CCN, thereby forming a final MG identifier list associated with at least one MG capable of being used in a call by the first CCN, the second CCN and the third CCN, and
the third CCN selecting the specified MG, for establishing the user plane, from the final MG identifier list and sending a second backward message from the third CCN to the second CCN identifying the specified MG.

14. The system according to claim 13 wherein the associated persistent memory having stored instructions to cause the second processor in the second CCN to:
receive the second backward message, including the specified MG, from the third CCN;
confirm that the specified MG is on the modified MG identifier list; and
if the specified MG is not on the modified MG identifier list, select a non-specified MG known in the second CCN and applicable to the call.

15. The system according to claim 12 further comprising:
receiver means for receiving in the first CCN the first backward message, including the specified MG, from the second CCN.

16. The system according to claim 12 wherein the first CCN sends the first MG identifier list to the second CCN in a call setup message.

17. The system according to claim 12 wherein the second CCN sends the first backward message as an Application Transport Mechanism (APM).

18. The system according to claim 12 wherein the second processor in the second CCN passes the first MG identifier list to a third CCN if the second CCN does not control a MG.

19. The system according to claim 12 wherein the first CCN and the second CCN utilize a call control protocol for sending messages.

20. The system according to claim 19 wherein each identifier in the first MG identifier list and the modified MG identifier list is a Bearer Control Unit Identifier (BCU-ID).

21. The system according to claim 20, further comprising instructions in the associated persistent memory for causing the second processor to:
send a Media Gateway Group (MGG) identifier, representing a group of BCU-IDs in the first MG identifier list, between the first and second CCNs, and
processor means in an intermediate CCN for associating a new MGG identifier with the group of BCU-IDs when the intermediate CCN removes a BCU-ID from the group of BCU-IDs.

22. The system according to claim 19 wherein the call control protocol is one of a Bearer Independent Call Control (BICC) or Session Initiated Protocol (SIP).

23. A call control node (CCN) for negotiating Media Gateways (MGs) to be used in a call, the CCN comprising a processor and an associated persistent memory, the associated persistent memory having stored instructions that cause the processor to:
construct and send to a subsequent CCN a first MG identifier list including at least one MG that is capable of being used in a call, wherein the subsequent CCN removes any MG identifier from the first MG identifier list not capable of being used by the subsequent CCN and sends a modified MG identifier list to another CCN and the another CCN removes any remaining MG identifier from the modified MG identifier list that is not capable of being used by the another CCN, resulting in a final MG identifier list;
receive a backward message, including a specific MG identifier selected from the final MG identifier list, from the subsequent CCN, which includes MG identifiers that are capable of being used by the CCN, the subsequent CCN and the another CCN; and
complete a user plane, for the call, between the specific MG identifier selected from the final MG identifier list capable of being used by the CCN, the subsequent CCN and the another CCN.

24. The call control node according to claim 23 further comprising instructions in the associated persistent memory for causing the processor:
- to determine if a specified MG for use in a call is on the first MG identifier list; and
- to select another MG from the first MG identifier list if the specified MG is not on the first MG identifier list.

25. The call control node according to claim 23 having instructions in the associated persistent memory for causing the processor to receive the backward message, as an Application Transport Mechanism (APM), from the subsequent CCN.

26. The call control node according to claim 23 wherein the subsequent CCN forwards the first MG identifier list to yet another CCN if the subsequent CNN does not control a MG.

27. The call control node according to claim 23 wherein the CCN utilizes a Bearer Independent Call Control protocol or Session Initiated Protocol for sending messages.

28. The control node according to claim 23, further comprising instructions in the associated persistent memory for causing the processor to:
- to send a Media Gateway Group (MGG) identifier, representing a group of Bearer Control Unit Identifiers (BCU-IDs) in the first MG identifier list, between the CCNs, and
- processor means in an intermediate CCN for associating a new MGG identifier with the group of BCU-IDs when the intermediate CCN removes a BCU-ID from the group of BCU-IDs.

29. The call control node according to claim 23 further comprising instructions in the associated persistent memory for causing the processor to select a specified MG from the modified MG identifier list.

* * * * *

UNITED STATES PATENT AND TRADEMARK OFFICE
CERTIFICATE OF CORRECTION

Page 1 of 1

PATENT NO.        : 9,112,959 B2
APPLICATION NO.   : 12/206218
DATED             : August 18, 2015
INVENTOR(S)       : Dirk Kampmann It is certified that error appears in the above-identified patent and that said Letters Patent is hereby corrected as shown below:

Title page item (60), in Related U.S. Application Data, in Column 1, include "Provisional application No. 60/971,704, filed on September 12, 2007."

Signed and Sealed this
Twenty-ninth Day of December, 2015

Michelle K. Lee
*Director of the United States Patent and Trademark Office*